UNITED STATES PATENT OFFICE 2,275,270

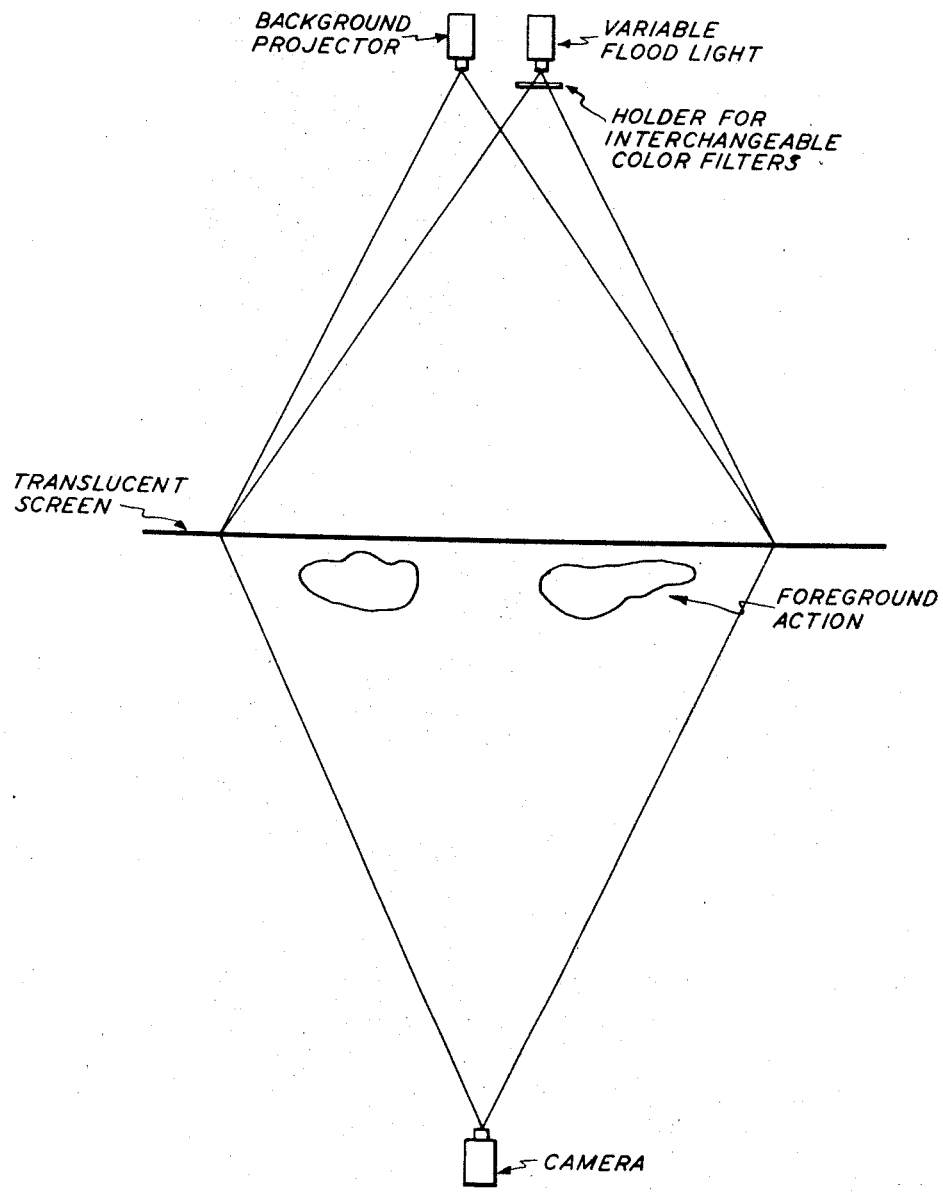

MOTION PICTURE CONTRAST REGULATION

Gerald F. Rackett, Los Angeles, Calif., assignor to Technicolor Motion Picture Corporation, Los Angeles, Calif., a corporation of Maine Application August 16, 1939, Serial No. 290,431

1 Claim. (Cl. 88—24)

In various branches of the art of motion pictures it is often desirable to vary the contrast of the pictures after the film has been completed ready for projection. For example, in background projection it is frequently desirable to vary the contrast of the projected background scene to suit the contrast of the foreground scene after the latter is set up and illuminated. Furthermore, in the case of background projection with pictures in natural colors there is a tendency toward dilution or desaturation of colors resulting from projecting flare and other causes.

Objects of the present invention are to provide a process which affords ready control of the contrast of projected pictures at the time of projection, which permits variation in the contrast of background projection to match a foreground scene, which permits the use of a more fully exposed print for projection purposes, thereby obtaining greater coverage in the highlights, which permits reduction of the black-and-white contrast of a scene projected in colors without apparently decreasing the color saturation in the same degree, which permits ready control of the effective overall color balance of projected color pictures at the time of projection, and which generally improves the projection control, particularly background projection of color pictures.

In one aspect the present invention involves developing picture transparencies with excessive contrast and then, in projecting the pictures, illuminating the screen with auxiliary light to reduce the contrast to the desired degree, thereby controlling the effective contrast at the time of projection. The auxiliary illumination may comprise colored light or white light (the latter term being intended to include unfiltered light from an incandescent or arc lamp even though it has a yellowish or bluish cast), the illumination may be distributed over all or any part of the screen either uniformly or non-uniformly, and it may be applied to either side of the screen by any suitable means as by an auxiliary projector adjacent the picture projector.

A typical arrangement for practicing this new method is shown in the accompanying drawing.

In another aspect the present invention involves projecting on a screen color pictures having abnormally high contrast and concomitantly illuminating the screen with auxiliary light adjusted approximately to that value which reduces the black-and-white contrast of the color pictures to normal or at least to the desired degree. The abnormal contrast may be produced in various ways as by over-exposure and/or over-development. While this serves to counteract the aforesaid tendency toward dilution or desaturation of colors it also results in excessive black-and-white contrast which, in the case of background projection, is conspicuously different from the normal contrast of the foreground scene. However, with the overall illumination it is possible to reduce the black-and-white contrast without correspondingly reducing the apparent color saturation, that is the color contrast or color purity. By over-exposing the film it is possible also to obtain greater coverage in the highlights. By inserting a suitable filter in the beam of auxiliary light it is possible also to change the overall color balance of the projected pictures, and by choosing the proper filter it is possible either to correct improper color balance inherent in the film or to compensate for unbalancing factors such as a color of screen or projection light other than that for which the inherent color balance of the film was originally determined.

While the present invention may be utilized in other branches of the art of picture projection it is particularly useful in photographing motion pictures in color with background projection in color, that is foreground action in front of a translucent screen upon which a colored background is projected from the side opposite to the camera. Under the conditions ordinarily prevailing in background projection the colors in the projected pictures appear to be diluted or desaturated, but by using auxiliary light as above explained this desaturated appearance can be avoided without objectionable increase in the effective black-and-white contrast.

It should be understood that the present disclosure is for the purpose of illustration only and that this invention includes all modifications and equivalents which fall within the scope of the appended claim.

I claim:

The method of regulating the contrast of motion pictures of the type having highlights, shadows and various intermediate tones which comprises projecting pictures having excessive contrast upon a background screen behind a foreground and controlling the contrast of the projected pictures by concomitantly illuminating the screen with auxiliary light adjusted to reduce the contrast into correspondence with the foreground.

GERALD F. RACKETT.